Figures 1, 2:
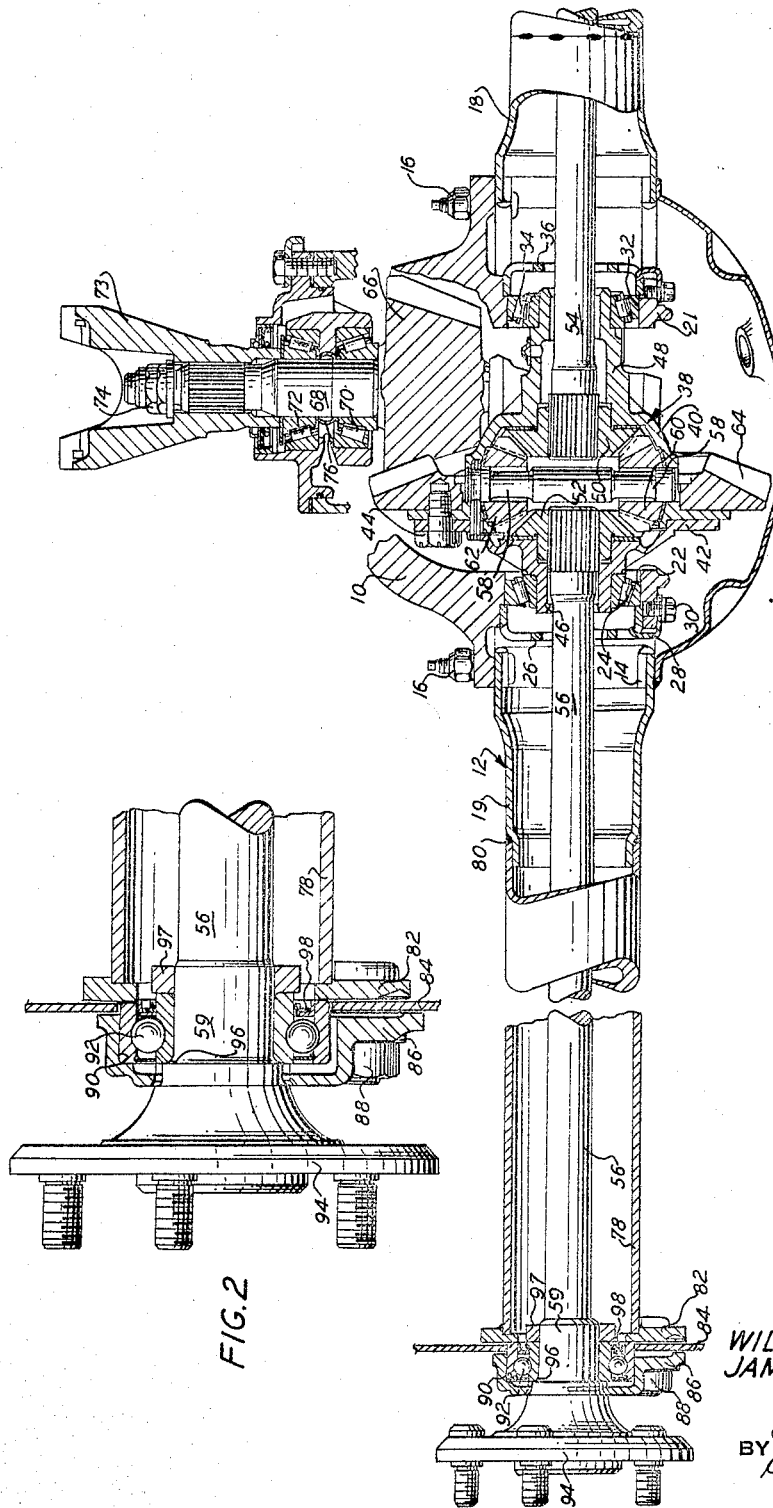

Sept. 6, 1966  W. E. RUDNICKI ETAL  3,270,583
AXLE HOUSING ASSEMBLY
Filed July 23, 1962

WILLIAM E. RUDNICKI
JAMES M. BENSON
INVENTORS

BY Donald J. Harrington
Robert E. McCallum
ATTORNEYS

United States Patent Office 3,270,583
Patented Sept. 6, 1966

3,270,583
AXLE HOUSING ASSEMBLY
William E. Rudnicki, Detroit, and James M. Benson, Warren, Mich., assignors to The Ford Motor Company, Dearborn, Mich., a corporation of Delaware
Filed July 23, 1962, Ser. No. 211,816
3 Claims. (Cl. 74—607)

Our invention relates generally to improvements in axle shaft and differential assemblies for wheeled automotive vehicles, and more particularly to an improved means for journaling an axle shaft at the extremity of a relatively stationary axle shaft housing extension.

It is common automotive design practice to manufacture axle shaft housing extensions in the form of a tubular shaft. At the outboard extremity of the housing extension there is secured an axle shaft flange member which may be welded in place. After the welding operation is completed, the axle shaft housing must be mounted appropriately in a fixture to facilitate a boring operation. Concentric bores for an axle shaft bearing and a seal are required. These bores must be positioned coaxially with respect to the axle shaft and the vehicle brake plate that is bolted to the axle shaft flange member. This machining operation is relatively complex and it is very difficult to maintain close tolerances. Furthermore, when the bearing is located within the flange member of the axle shaft housing, the bearing loads are positioned relatively remotely with respect to the load center for the wheel. This establishes a bending couple that tends to distort the axle shaft housing.

It is an object of our invention to provide an axle shaft and differential housing assembly wherein concentricity of the wheel bearing and the center line of the wheel brake structure can be maintained while employing a simplified machining procedure.

It is a further object of our invention to provide an axle shaft bearing arrangement wherein the distance between the load center of the bearing and the load center of the wheel is reduced relative to the corresponding spacing for conventional axle shaft housing constructions. This reduces substantially the bearing loads.

It is a further object of our invention to provide a wheel bearing arrangement that eliminates the need for providing a separate bore for an axle shaft seal. The need for precisely locating the center line of the seal with respect to the center line of the bearings thus is eliminated.

It is a further object of our invention to provide an axle shaft housing construction wherein concentricity of the wheel brake structure and the wheel drum can be maintained with closer tolerances than the corresponding tolerances that are possible with conventional wheel brake constructions. This tends to reduce the degree of "brake fading" or loss of braking capacity that is often experienced.

It is a further object of our invention to provide an axle shaft housing construction wherein a so-called "out-of-squareness" of the wheel brake backing plate and the wheel drum can be reduced to a minimum degree.

Further objects and features of our invention will become apparent from the following description and from the accompanying drawings, wherein:

FIGURE 1 shows in cross sectional form an axle shaft and differential housing assembly embodying the features of our invention; and FIGURE 2 is an enlarged view of the outboard extension showing our improved axle shaft mounting means.

Referring first to FIGURE 1, numeral 10 designates a differential housing. An axle housing, shown at 12, includes a banjo portion 14 to which the housing 10 is bolted by means of bolts 16. Housing 12 includes also axial extensions 18 and 19 situated on either side of the banjo portion 14. Semicircular bearing caps 20 and 21 are bolted to the housing 10, the latter having semi-circular portions that cooperate with the semi-circular caps 20 and 21 to define circular bearing openings, one of which is shown at 22. A suitable tapered roller bearing 24 is received within the opening 22. An externally threaded bearing retainer 26 is received threadably within opening 22 and suitably positions the outer race of the bearing 24. A locking element 28 is bolted by a bolt 30 to the bearing cap 20 thereby retaining the retainer 26 in a bearing engaging position.

The bearing cap 21 similarly cooperates with the housing 10 to define a circular bearing opening 32 within which is fitted a bearing 34. The outer race of the bearing 34 is engaged by an externally threaded bearing retainer 36 that is received within the opening 32.

A differential case is shown at 38. It is formed in two parts respectively identified by reference numerals 40 and 42. The portions 40 and 42 have peripheral flanges that are bolted together by bolts 44. The portion 42 has an axial extension 46 which is journaled within the bearing 24. In a similar fashion, case portion 40 is formed with an extension 48 which is received within bearing 34.

The case 38 encloses a first differential side gear 50 and another differential side gear 52. The gear 50 is splined to an axle shaft 54 and the gear 52 is splined to an axle shaft 56. These shafts 54 and 56 are aligned.

A differential pinion shaft 58 is carried by the case 38. It rotatably journals a pair of differential pinions 60 and 62 that are disposed in meshing engagement with differential side gears 50 and 52.

The periphery of case portion 40 carries a differential ring gear 64 that is secured in place by the aforementioned bolts 44. This ring gear 64 drivably engages a differential drive pinion 66 that is straddle mounted within the housing 10.

Pinion 66 is supported by a pinion shaft 68 that in turn is received within roller bearings 70 and 72.

Bearings 70 and 72 are received within suitable bearing openings formed in the housing 10. The outwardly extending portion of shaft 68 is splined to provide a driving connection between the pinion 66 and a universal joint drive flange 73. A clamping nut 74 is received threadably on the end of shaft 68.

The inner race for bearing 70 engages a cooperating shoulder on pinion 66 and the end of flange 73 engages the inner race for bearing 72. A deformable spacer 76 is situated between the inner races for the bearings 70 and 72, and when the nut 74 is tightened, the bearings 70 and 72 become preloaded.

The inboard end of the pinion 66 is mounted within a suitable bearing carried by a bearing flange that in turn forms a part of the housing 10.

Axle shafts 54 and 56 extend transversely with respect to the axis of the pinion 66 and their outboard ends are connected drivably to the vehicle traction wheels.

Shaft 56 extends concentrically through an axle shaft housing extension 78 that is welded at 80 to the end of extension 19 for the axle housing 12. A flange 82 is welded to the outboard end of the extension 78.

A wheel brake mounting plate 84 is bolted to the flange 82. A wheel bearing retainer 86 also is bolted to the flange 82. In one working embodiment of our invention, four bolts 88 are provided for bolting the flange 82, the plate 84 and the retainer 86 together in one composite assembly. A bearing opening 90 is machined in the bearing retainer 86 to accommodate a wheel bearing 92. This machining operation is done prior to assembly.

The axle shaft 56 is formed with a boss 59 that is received in the inner race of bearing 92. The outward end of axle shaft 56 has integrally formed thereon a wheel drum drive flange 94. An annular shoulder 96 is formed between the boss 59 and the flange 94 to engage the inner race of bearing 92. The inner race is positioned also by a ring 97 that is secured to the boss 59 by means of a press fit.

Bearing 92 is formed with an integral seal assembly 98 which is disposed between the inner and outer bearing races as indicated.

The bearing retainer 86 is positioned accurately with respect to the flange 82 by using close tolerances between the bolt holes and the bolt openings. Concentricity between the axle shaft housing and the wheel drum thus is maintained. Also, concentricity between the brake structure and the wheel drum can be maintained accurately since the bolt holes for the bolts 88 are aligned with the corresponding openings in the wheel brake mounting plate 84.

In our improved construction, the bearing 92 is located on the outboard side of brake mounting plate 84. The vertical loads placed upon the bearing 92 therefore act through a line that is relatively close to the load center for the adjacent vehicle wheel. The force couple established by these forces then is of a reduced value compared to the corresponding force couple that exists with conventional wheel bearing constructions.

It will be apparent also that the flange 82 is in the form of a simple plate and its use eliminates the need for providing a relatively expensive wheel bearing flange stamping. Further, the machining operations normally associated with conventional wheel bearing flange stampings can be eliminated. This machining operation normally is carried out as a final manufacturing operation so that it is necessary to mount the entire axle and differential housing in a suitable fixture to facilitate the boring operation that must be carried out on the wheel bearing flange member.

Having thus described a preferred embodiment of our invention, what we claim and desire to secure by U.S. Letters Patent is:

1. An axle shaft and housing assembly comprising an axle shaft, a drive flange on one end of said shaft, said drive flange being adapted to accommodate a connection with a wheel drum, an axle shaft housing, said axle shaft being received within said housing, a rigid flange plate secured to the end of said housing, a wheel brake mounting plate, said flange plate being secured to one side of said mounting plate, a bearing adapter, said bearing adapter, said mounting plate and said flange plate being bolted together with the bearing adapter on the other side of said mounting plate whereby bearing loads in a direction transverse to the axis of said axle shaft are transmitted through said flange plate to said axle shaft housing, a bearing recess formed in said bearing adapter, and bearing means within said adapter for journaling the outboard end of said axle shaft.

2. An axle shaft and housing assembly comprising an axle shaft, a drive flange on one end of said shaft, an axle housing, said axle shaft being received within said housing a bearing boss formed on said axle shaft adjacent said drive flange, a rigid flange plate secured to the end of said housing, a wheel brake mounting plate, said flange plate being bolted to the inboard side of said mounting plate, and a bearing adapter secured to said flange plate on the other side of said mounting plate, and adapted to transmit transverse bearing loads directly through said flange plate to said axle housing said bearing adapter having formed therein a circular recess for accommodating a circular bearing, said bearing boss being journaled within said bearing.

3. An axle shaft and housing assembly comprising an axle shaft, a drive flange on one end of said shaft, said drive flange being adapted to accommodate a connection with a wheel drum, an axle shaft housing, said axle shaft being received within said housing, a rigid flange plate secured to the end of said housing, a wheel brake mounting plate, said flange plate being secured to one side of said mounting plate, a bearing adapter, said bearing adapter, said mounting plate and said flange plate being bolted together whereby bearing loads in a direction transverse to the axis of said axle shaft are transmitted through said flange plate to said shaft housing, a bearing recess in the form of a bore formed in said bearing adapter, bearing means within said adapter for journaling the outboard end of said axle shaft, said bearing means comprising an inner race and an outer race, said outer race being received within said bore, said shaft being received within said inner race, and aligned bolt openings formed in said bearing adapter, said mounting plate and said flange plate.

References Cited by the Examiner

UNITED STATES PATENTS 2,731,575   1/1956   Hershberger _____ 308—189
3,025,716   3/1962   Muller _____ 74—607

FRED C. MATTERN, Jr., *Primary Examiner.*

BROUGHTON G. DURHAM, *Examiner.*

W. S. RATLIFF, *Assistant Examiner.*